(12) United States Patent
Anderson et al.

(10) Patent No.: US 7,350,154 B2
(45) Date of Patent: Mar. 25, 2008

(54) VIRTUAL DESKTOP MANAGER

(75) Inventors: Bret Paul Anderson, Puyallup, WA (US); Kelly Elizabeth Rollin, Seattle, WA (US); Daniel J Shapiro, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/293,421

(22) Filed: Dec. 1, 2005

(65) Prior Publication Data

US 2006/0085760 A1 Apr. 20, 2006

Related U.S. Application Data

(62) Division of application No. 10/117,856, filed on Apr. 5, 2002, now Pat. No. 7,010,755.

(51) Int. Cl.
G06F 3/00 (2006.01)
(52) U.S. Cl. .................. 715/778; 715/779; 715/838
(58) Field of Classification Search ............. 715/778, 715/779, 800, 838
See application file for complete search history.

(56) References Cited

U.S. PATENT DOCUMENTS

| | | |
|---|---|---|
| 5,564,002 A | 10/1996 | Brown |
| 5,841,435 A | 11/1998 | Dauerer et al. |
| 6,008,809 A | 12/1999 | Brooks |
| 6,549,217 B1 * | 4/2003 | De Greef et al. ........... 715/745 |
| 6,664,983 B2 * | 12/2003 | Ludolph ..................... 715/775 |
| 6,710,788 B1 | 3/2004 | Freach et al. |
| 6,727,596 B2 * | 4/2004 | Takabayashi et al. ....... 257/786 |
| 6,727,918 B1 * | 4/2004 | Nason ........................ 715/791 |
| 6,807,666 B1 * | 10/2004 | Evans et al. ................ 718/108 |
| 6,850,256 B2 | 2/2005 | Crow et al. |
| 6,895,359 B2 * | 5/2005 | Sakurada et al. ........... 702/167 |
| 2003/0179240 A1 | 9/2003 | Gest |

OTHER PUBLICATIONS

Enable Virtual Desktop, Enable Software Pty Ltd, Copyright 1999, pp. 1-5.
*The Official Red Hat Linux Started Guide*, Red Hat, Inc., Durham, NC 2000.

* cited by examiner

*Primary Examiner*—Kieu D. Vu
(74) *Attorney, Agent, or Firm*—Christensen O'Connor Johnson Kindness PLLC

(57) ABSTRACT

A method for a user to preview multiple virtual desktops in a graphical user interface is described. The method comprises receiving an indication from a user to preview the multiple virtual desktops and displaying multiple panes on the display. Each pane contains a scaled virtual desktop having dimensions that are proportionally less than the dimensions of a corresponding full-size virtual desktop. Each scaled virtual desktop displays with one or more scaled application windows as shadows if the corresponding full-size virtual desktop has one or more corresponding application windows that are active.

6 Claims, 16 Drawing Sheets

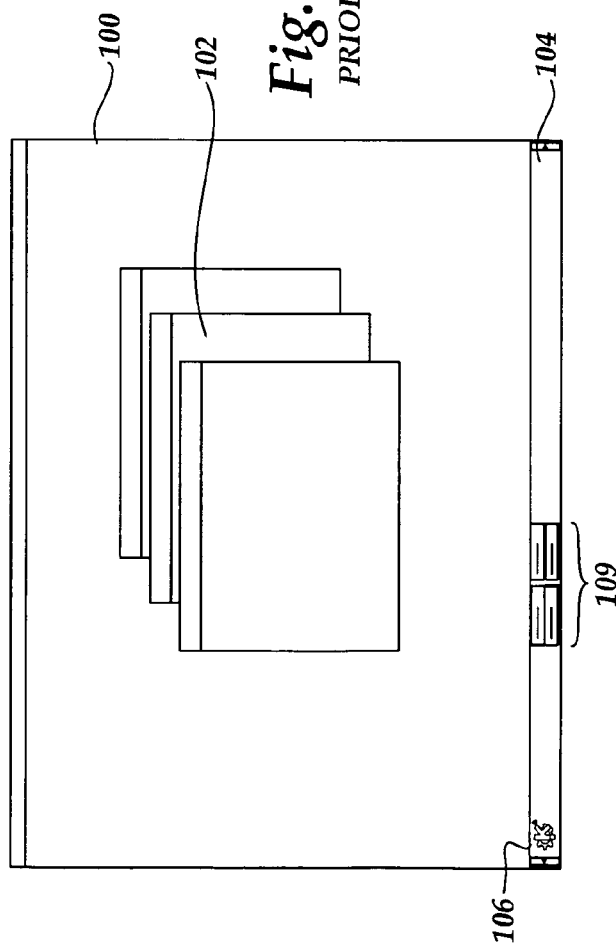
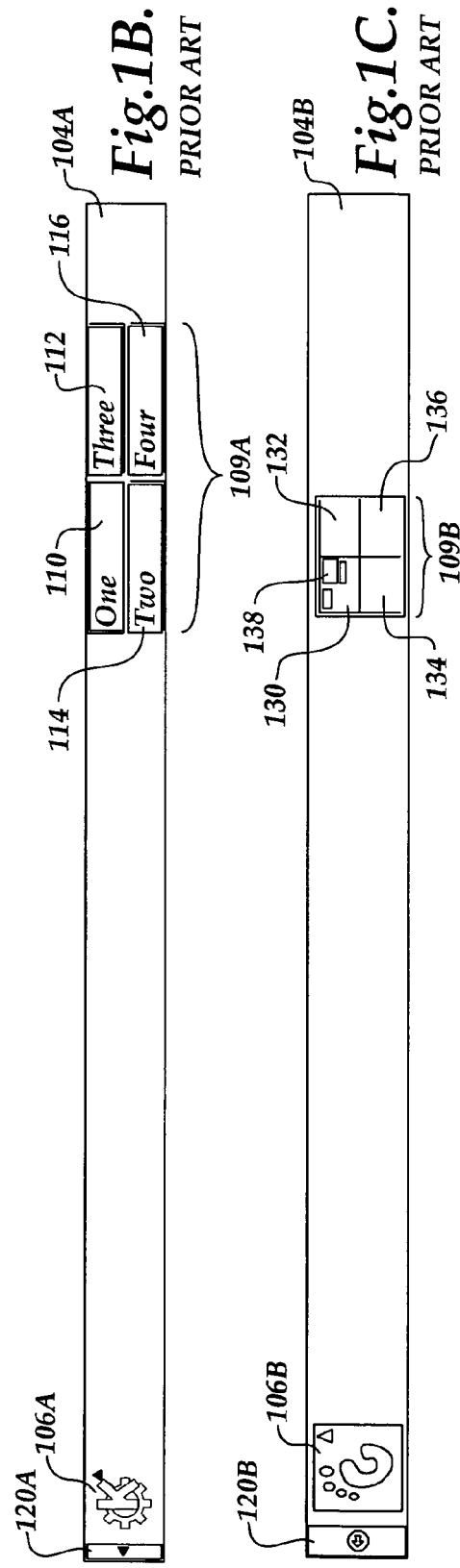
*Fig. 1A.* PRIOR ART
*Fig. 1B.* PRIOR ART
*Fig. 1C.* PRIOR ART

VIRTUAL DESKTOP MANAGER

CROSS-REFERENCE TO RELATED APPLICATION

This application is a division of application Ser. No. 10/117,856, filed on Apr. 5, 2002 now U.S. Pat. No. 7,010,755.

FIELD OF THE INVENTION

This invention relates generally to the field of graphical user interfaces, and more particularly, to the desktop area of a graphical user interface.

BACKGROUND OF THE INVENTION

The desktop area of a graphical user interface simulates the top of a physical desk. The intent of the desktop simulation is to make a computer easier to use by enabling users to move pictures of objects and to start and stop tasks in much the same way they would if they were working on a physical desktop. A desktop simulation is characteristic of a number of operating systems, such as the Microsoft's Windows® and Apple Macintosh. For clarity purposes, the following discussion will term a "desktop simulation" as a desktop.

An example of a desktop 100 is shown in FIG. 1A, where one or more application windows 102 are displayed on the desktop 100. Each application window is associated with a software program (application) designed to assist in the performance of a specific task, such as word processing, accounting, or inventory management. The desktop 100 includes a button 106 for causing a pop-up menu (not shown) to appear on the desktop 100 so as to allow one or more application windows 102 to be launched. This button 106 resides in a panel 104 that lies along the bottom of the desktop 100.

When a sufficient number of application windows 102 are created and shown on the desktop 100, the desktop 100 may become confusingly cluttered, thereby making the computer harder to use. As a result, virtual desktops are provided to expand the size of the desktop 100. Each virtual desktop has the same size as the desktop 100. Using virtual desktops allows the group of application windows 102 to be dispersed throughout the virtual desktops, thereby reducing the cluttered appearance. Each virtual desktop may be accessed by clicking on an appropriate area in a desk guide 109. The desk guide may be located somewhere on the panel 104.

One conventional implementation of a desk guide is the desk guide 109A shown in FIG. 1B, where a panel 104A includes a button 106A for causing a pop-up menu (not shown) to appear on the desktop 100 to allow one or more application windows 102 to be launched. The panel 104A also includes a button 120A for minimizing the panel 104A. The desk guide 109A includes a number of buttons 110-116. Each button 110-116 may be clicked using a pointing device, such as a mouse, to bring up a virtual desktop associated with the clicked button. The name of each virtual desktop is displayed on a button, 110-116. These names may be changed. As more and more application windows 102 are dispersed throughout these virtual desktops, it may be difficult for a user to remember which desktop contains which application window. The problem with the desk guide 109A is that it does not allow a user to quickly grasp where he or she has placed various application windows without visiting each of the virtual desktops by clicking on each of the buttons 110-116.

Another implementation of a desk guide is the desk guide 109B as shown in FIG. 1C. A panel 104B includes a button 106B for launching one or more application windows 102 similar to the button 106A discussed above, and like the button 120A, the panel 104B includes a button 120B for minimizing the panel 104B. The desk guide 109B is an improvement over the desk guide 109A in that each virtual desktop is shown as a pane 130-136. In each pane, running application windows appear as small, raised squares 138. Notwithstanding the improvement, the desk guide 109B has problems similar to the desk guide 109A because it is still not possible for a user to determine from these small raised squares 138 the desired application window for which he may be looking. Moreover, many of the panes look confusingly similar to one another, thereby hindering a user's ability to recognize the particular virtual desktop on which he or she had opened a desired application. Thus, a user still has to actually visit each virtual desktop to find a desired application window.

Therefore, there is a need to enhance the visualization of virtual desktops so that a user may locate a desired running application.

SUMMARY OF THE INVENTION

In accordance with the present invention, a method and computer readable medium for presenting multiple virtual desktops on a display of a computer system for previewing by a user are provided. A preview button is displayed on a desktop. When the preview button is selected, multiple panes are displayed on the desktop in a tiled manner. Each pane contains a scaled virtual desktop having dimensions that are proportional but less than the dimensions of a corresponding virtual desktop. Each scaled virtual desktop provides a representation of the corresponding full-size virtual desktop that would display albeit at a smaller scale. For example, if the corresponding full-size virtual desktop has one or more application windows that are shown on the full-size virtual desktop, the scaled virtual desktop would display one or more scaled application windows that correspond to the one or more application windows shown by the corresponding full-size virtual desktop.

In accordance with other aspects of this invention, the display includes first and second areas. The multiple panes, when displayed, occupy at least the first area of the display. The dimensions of the first area are substantially greater than the dimensions of the second area. In accordance with further aspects of this invention, the first area forms a work area and the second area includes a task bar. Preferably, the preview button is located in the task bar.

In accordance with yet other aspects of this invention, the background image of each scaled virtual desktop pane corresponds to its full-size virtual desktop. The use of corresponding backgrounds allows a user to immediately and visually identify the different full-size virtual desktops as well as the application windows that are running on those virtual desktops. In accordance with other further aspects of this invention, the scaled and full-size virtual desktops are animated in the sense that they progressively change in size (zoom), when shifting from a full-size virtual desktop to pane and vice versa.

In accordance with yet still other aspects of the present invention, application windows are shared across multiple virtual desktops. As the number of virtual desktops proliferates, a user may desire to access an application window that is opened in a full-size virtual desktop other than the current full-size virtual desktop. The method includes displaying controls, such as task buttons, representing all open application windows on the task bars of all full-size virtual desktops. When the user desires to open an application window in a current, full-size virtual desktop that is open in another full-size window, the user activates the associated icon. This action results in the desired application window being shifted to the current full-size virtual desktop.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a pictorial diagram illustrating a desktop of a graphical user interface according to the prior art.

FIG. 1B is a pictorial diagram illustrating one implementation of a panel containing a desk guide used to switch among multiple virtual desktops according to the prior art.

FIG. 1C is a pictorial diagram illustrating another implementation of a panel containing a desk guide used to switch among multiple virtual desktops according to the prior art.

DETAILED DESCRIPTION OF THE PREFERRED EMBODIMENT

Figure 2:
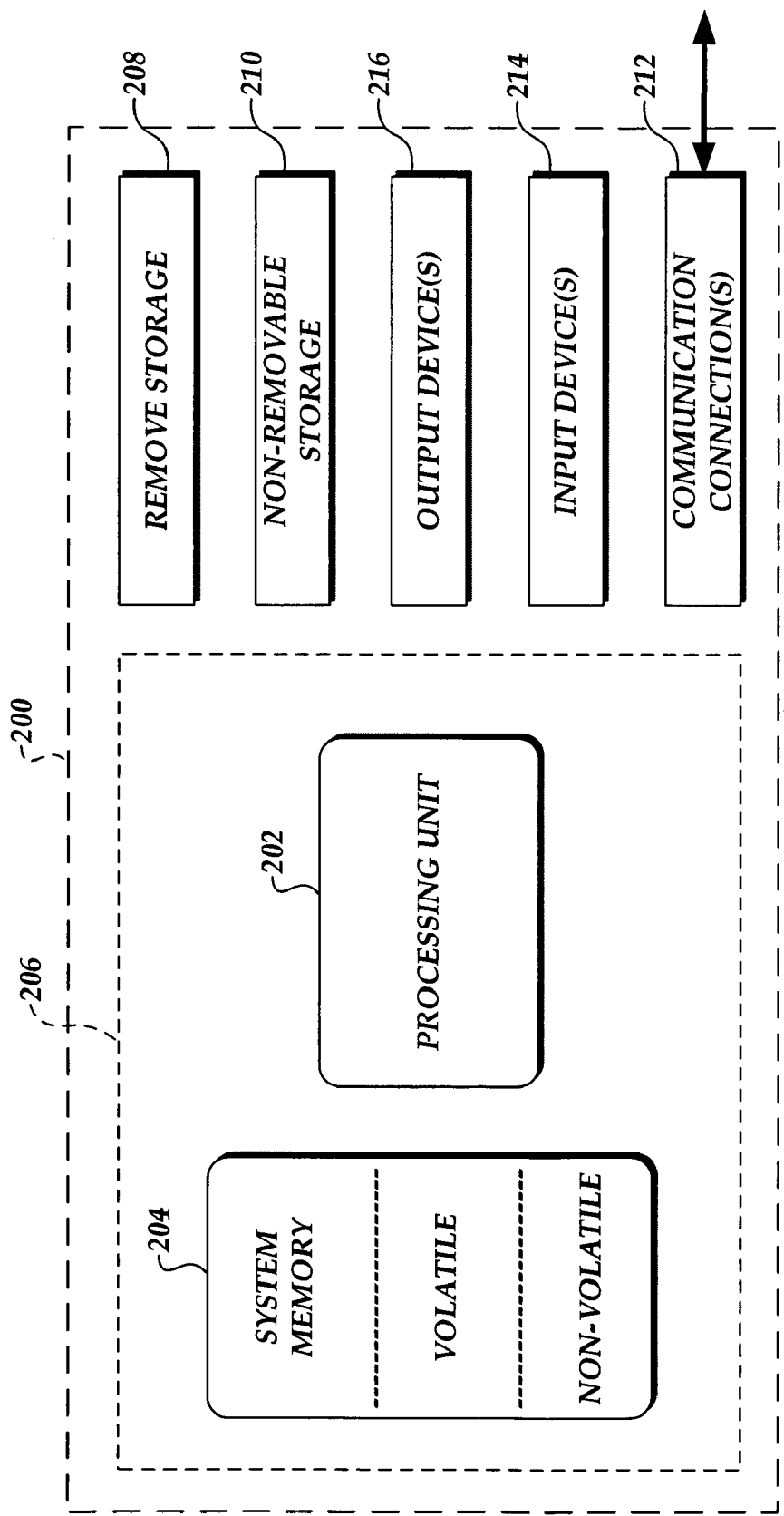
FIG. 2 is a block diagram illustrating a generic computing device in which the computer readable medium of the invention is usable.

FIG. 2 illustrates an exemplary computer device 200 for implementing the invention. In its most basic configuration, the computing device 200 typically includes at least one processing unit 202 and memory 204. Depending on the exact configuration and type of computing device, memory 204 may be volatile (such as RAM), non-volatile (such as ROM, flash memory, etc.), or some combination of the two. This most basic configuration is illustrated in FIG. 2 by dashed line 206. Additionally, the computing device 200 may also have additional features/functionality. For example, the computing device 200 may also include additional storage (removable and/or non-removable) including, but not limited to, magnetic disks, optical disks, or tape. Such additional storage is illustrated in FIG. 2 by removable storage 208 and non-removable storage 210. Computer storage media includes volatile and non-volatile, removable and non-removable media implemented in any method or technology for the storage of information, such as computer-readable instructions, data structures, program modules, or other data. Memory 204, removable storage 208, and non-removable storage 210 are all examples of computer storage media. Computer storage media includes, but is not limited to, RAM, ROM, EEPROM, flash memory, or other memory technology, CD-ROMs, digital versatile disks (DVDs), or other optical storage, magnetic cassettes, magnetic tape, magnetic disk storage, or other magnetic storage devices, or any other medium which can be used to store the desired information and which can be accessed by the computing device 200. Any such computer storage media may be part of the computing device 200.

The computing device 200 may also contain communications connection(s) 212 that allow the device to communicate with other devices. Communications connection(s) 212 is an example of communication media. Communication media typically embodies computer-readable instructions, data structures, program modules, or other data in a modulated data signal such as a carrier wave or other transport mechanism and includes any information delivery media. By way of example, and not limitation, communication media includes wired media such as a wired network or direct-wired connection, and wireless media such as acoustic, RF, infrared, and other wireless media. The term computer-readable media as used herein includes both storage media and communication media.

The computing device 200 may also have input device(s) 214 such as a keyboard, mouse, pen, voice input device, touch input device, etc. Output device(s) 216 such as a display, speakers, printer, etc. may also be included. Because all of these devices are well known in the art, they are not described in detail here.

The computing device 200 may include a graphical user interface, which is stored in memory 204 and is executed by the processing unit 202 to be presented on the display output device 216. A graphical user interface is a visual computer environment that represents programs, files, and options with graphical images, such as icons, menus, and dialog boxes on the screen. The user can select and activate these options by pointing and clicking with a mouse or, often, with a keyboard. In some computing devices, these options can be voice selected and activated. A particular item (such as a scrollbar) works the same way in all applications because the graphical user interface provides standard software routines to handle these elements and report the user's actions (such as a mouse click on a particular icon or at a particular location in text, or a key press).

Figure 3:
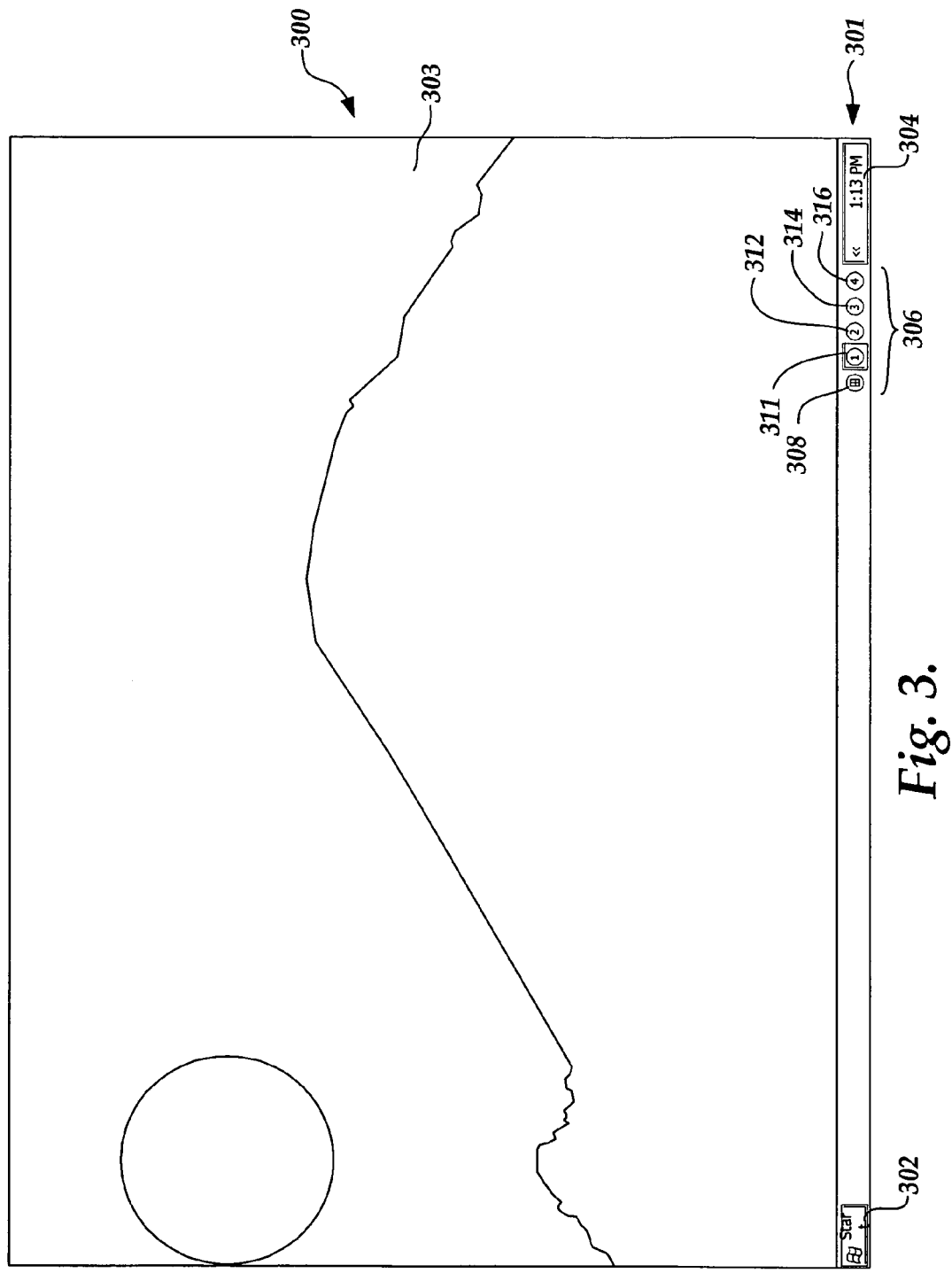
FIG. 3 is a pictorial diagram illustrating a full-size virtual desktop, including a virtual desktop manager having a preview button and a number of quick switch buttons according to one embodiment of the invention.

One type of graphical user interface creates a full-size virtual desktop 300 that includes an on-screen work area 303 having a background image, such as shown in FIG. 3. The virtual desktop 300 also includes a taskbar. The on-screen work area and the taskbar of a corresponding full-size virtual desktop cover all or substantially all of the viewable area of the display.

Figure 4:
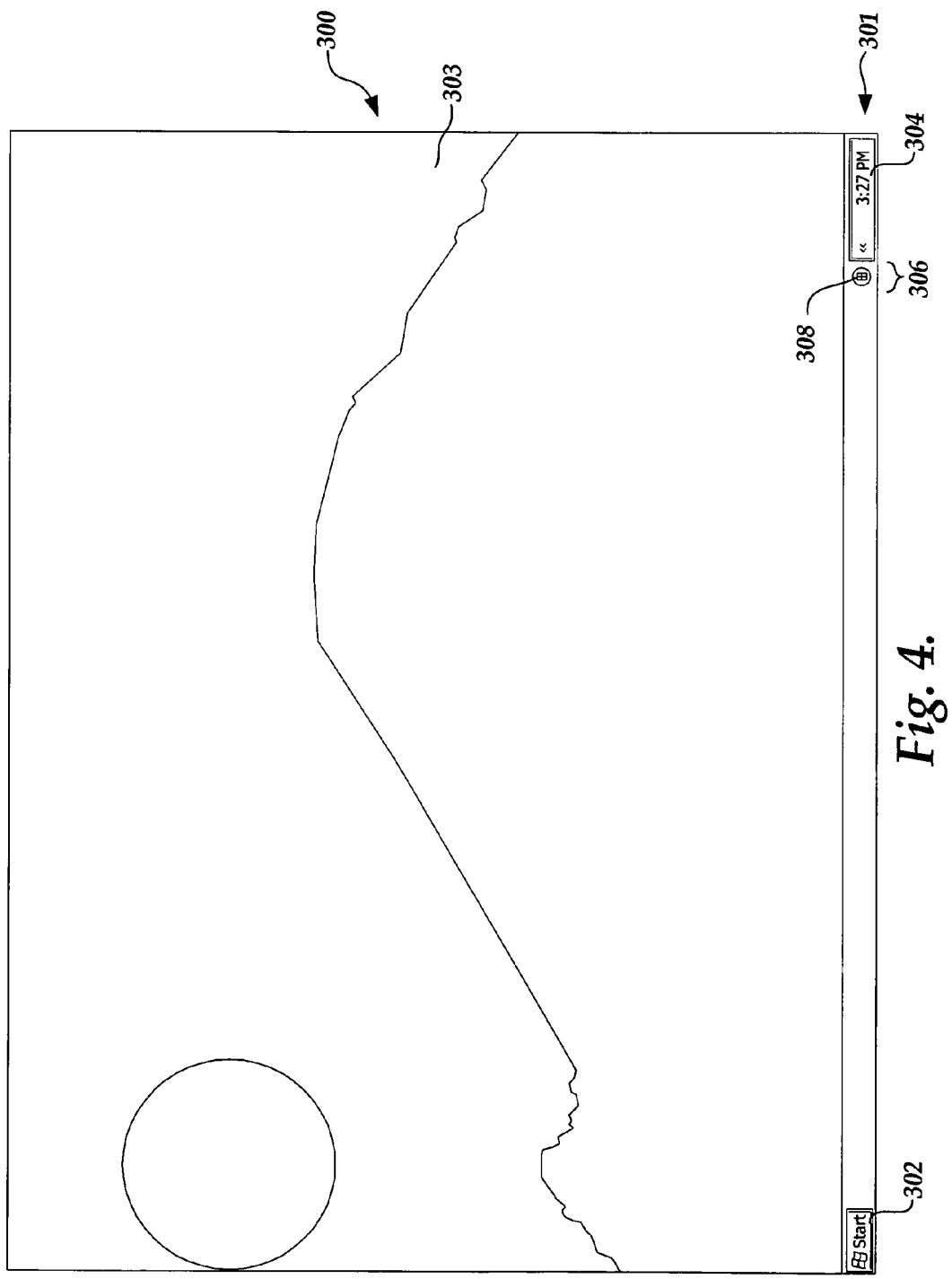
FIG. 4 is a pictorial diagram illustrating a full-size virtual desktop showing only a preview button according to one embodiment of the invention.

Located in the taskbar 301, shown in FIG. 3, is a tray 304, a virtual desktop manager 306, and a Start button 302. The virtual desktop manager 306 includes a number of buttons, namely a preview button 308 and a set of quick switch buttons 311-316. The set of quick switch buttons 311-316 is optional and need not be displayed as shown in FIG. 4. Selecting one of the quick switch buttons 311-316 allows a user to cause a corresponding full-size virtual desktop to be displayed.

Figure 5:
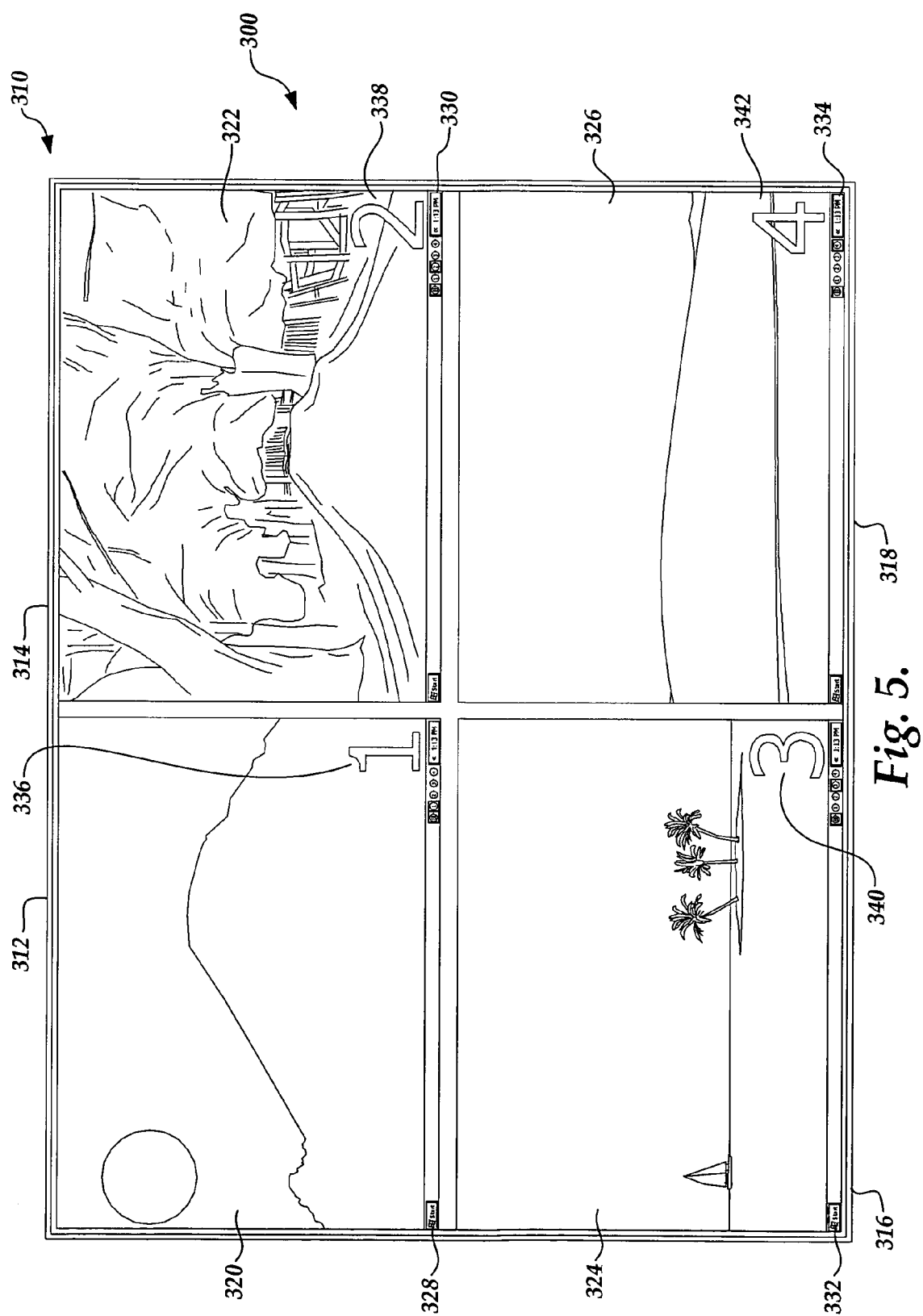
FIG. 5 is a pictorial diagram illustrating a preview window showing the tiled multiple panes, each including a scaled virtual desktop according to one embodiment of the invention.

When the user clicks on the preview button 308, a preview window 310 is displayed as shown in FIG. 5. The preview window 310 includes tiled multiple panes 312-318 and covers the area of the display normally covered by a full-size virtual desktop, i.e., the entire viewable area of the display. In each pane is a scaled virtual desktop having dimensions that are proportionately less than the dimensions of a corresponding full-size virtual desktop. In the example shown in FIG. 5, there are four scaled virtual desktops 320-326. Each scaled virtual desktop 320-326 may have a different background image. In this example, if less than four virtual desktops have been created, the on-screen work area of one or more of the scaled virtual desktops 320-326 may be blank. Preferably, each scaled virtual desktop is identified by a number 336-342. Each scaled virtual desktop 320-326 includes a taskbar 328-334.

Preferably, the virtual desktop manager 306 has an animation capability that animates the presentation of the preview window 310 in a way that gives a user a spatial sense of the arrangement of the virtual desktops. For example, suppose a sequence of actions begins with the user being presented the full-size virtual desktop 300 shown in FIG. 3. This virtual desktop corresponds to the scaled virtual desktop 320, shown in the upper left hand pane 312 of FIG. 5. Suppose next that the user clicks on the preview button 308 shown in FIG. 3. In response, the virtual desktop manager 306 progressively shrinks (zooms) the dimensions of the full-size virtual desktop 300 shown in FIG. 3 into the upper left hand pane 312 of FIG. 5. As the virtual desktop manager 306 animates (shrinks) the full-size virtual desktop 300 shown in FIG. 3 in this manner, it displays the other virtual desktops 322-326 in other panes 314-318 of FIG. 5.

Now, suppose that the user selects the virtual desktop 320 located in the upper left hand pane 312 of FIG. 5 by clicking on that pane 312 while the preview window 310 is displayed. The animation capability of the virtual desktop manager 306 operates in the opposite manner and progressively expands (zooms) the dimensions of the scaled virtual desktop 320 until it has the dimensions of and becomes the full-size virtual desktop 300, which occupies all or substantially all of the viewable area of the display.

Figure 6:
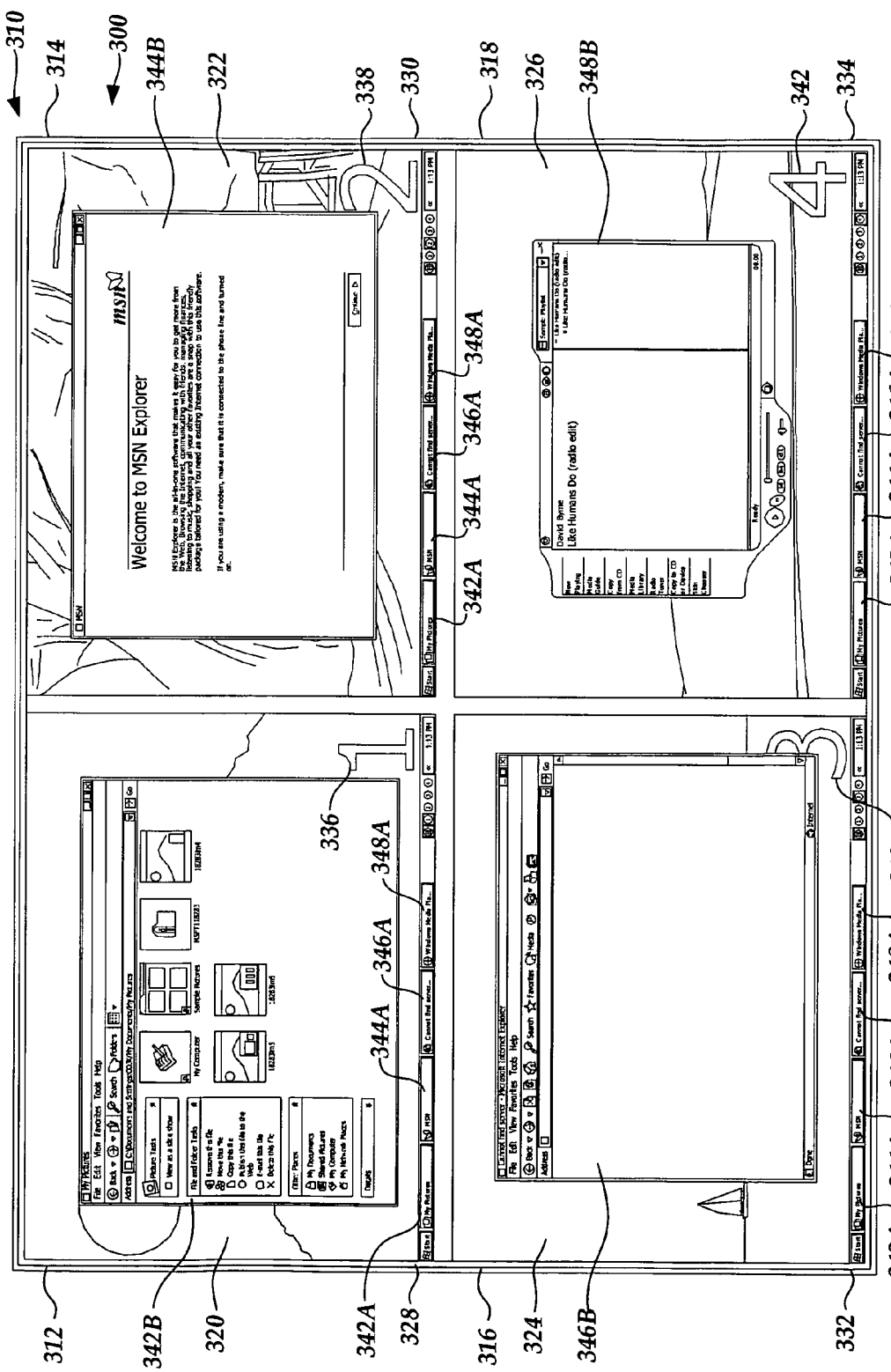
FIG. 6 is a pictorial diagram illustrating a preview window showing application buttons that are shared across tiled multiple panes, each including a scaled virtual desktop according to one embodiment of the invention.

FIG. 6 illustrates a number of application windows 342B-348B shown running on tiled multiple scaled virtual desktops 320-326 in the preview window 310. More specifically, one application window 342B is active on the scaled virtual desktop 320 located in the upper left hand pane of the preview window 310, another application window 344B is active on the scaled virtual desktop 322 located in the upper right hand pane of the preview window 310, a further application window 346B is active on the scaled virtual desktop 324 located in the lower left hand pane of the preview window 310, and another application window 348B is active on the scaled virtual desktop 326 located in the lower right hand pane of the preview window 310. These application windows 342B-348B are shown as shadows. As used here, the term "shadow" means an imperfect or faint representation of an actual representation of an application window. Because each of these application windows 342B-348B is active in a particular virtual desktop, none of them is shown to be active in more than one virtual desktop, thereby preventing the clutter that may confuse users operating a single virtual desktop graphical user interface. Moreover, the preview window 310 allows a user to apprehend macroscopically all the virtual desktops at once as well as where he may have placed various application windows without visiting each of the virtual desktops by separately clicking on each of the set of quick switch buttons 311-316.

Each of the application windows 342B-348B has a task button 342A-348A, located in the window's corresponding taskbar 328-334. When the sharing aspect of the virtual desktop manager is enabled, all of these task buttons are made visible in the taskbar of each of the full-size virtual desktops and correspondingly of the scaled virtual desktops. The first task button 342A corresponds to the application window 342B located in the upper left hand pane, the second task button 344A corresponds to the application window 344B located in the upper right hand pane, the third task button 346A corresponds to the application window 346B located in the lower left hand pane, and the fourth task button 348A corresponds to the application window 348B located in the lower right hand pane.

When application sharing is enabled, an application window that is active in one virtual desktop may be made active in another virtual desktop. For clarity purposes, the following example uses scaled virtual desktops as if they were actual virtual desktops, but it should be understood that the function of application sharing operates in the context of a full-size virtual desktop, i.e., a virtual desktop taking up all or substantially all of the screen display area. Suppose the current full-size virtual desktop is the full-size virtual desktop associated with the scaled virtual desktop 320 with the active application window 342B located in the upper left hand pane. Suppose the user wishes to switch to run the application window 348B located in the lower right hand pane. Instead of switching to the full-size virtual desktop associated with the scaled virtual desktop 326 located in the lower right hand corner by closing the full-size virtual desktop and opening the other full-size virtual desktop, the user can click on the related task button 348A without changing full-size virtual desktops. When this occurs, the application window 348B (to be switched) moves from the full-size virtual window in which it was located to the current full-size virtual desktop. Thus, in this example, the application window 348B shown in the lower right hand pane shifts to the full-size virtual desktop associated with the scaled virtual desktop shown in the upper left hand pane. When the preview window 310 is opened again, the switched application window 348B is shown in the scaled virtual desktop shown in the upper left hand pane.

When sharing is not enabled, only the task buttons that correspond to the active application windows are shown in the taskbars of the full-size virtual desktops. This is illustrated by the scaled virtual desktops shown in FIG. 7. For example, the taskbar 328 shown in the upper left hand pane includes only the task button 342A which corresponds to the application window 342B open in the associated full-size virtual desktop. The task bar shown in the upper left hand pane does not include the task buttons 344A-348A associated with the application windows that are open in the other full-size virtual desktops. Similarly, the taskbars 330-334 shown in the other panes display only the task buttons 344A-348A corresponding to the applications windows 344B-348B that are active in their associated full-size virtual desktops. As more and more application windows are opened, disabling the sharing feature has the advantage of improving taskbar clutter.

Figure 7:
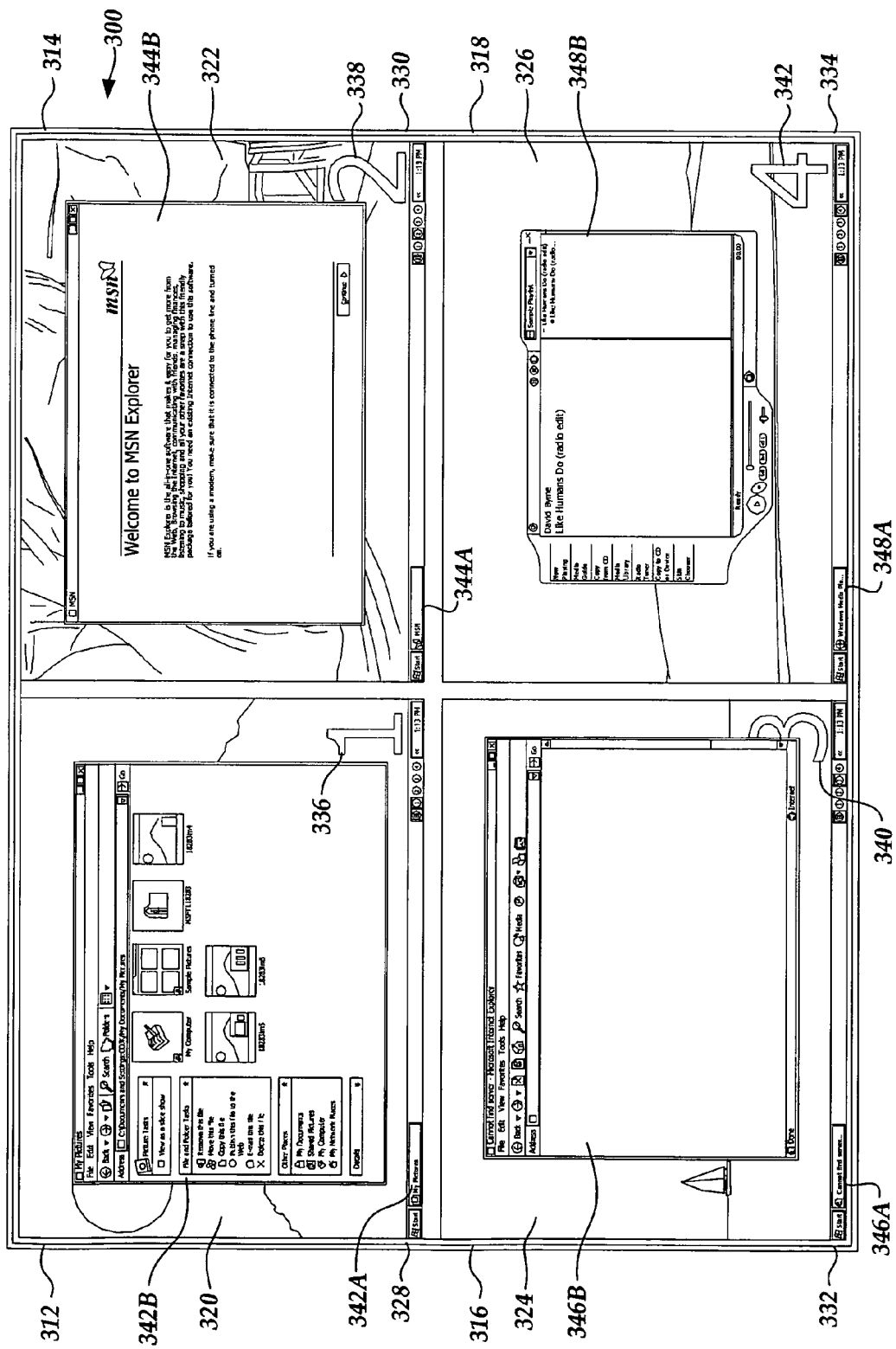
FIG. 7 is a pictorial diagram illustrating a preview window showing that the sharing of application windows is disabled across tiled multiple panes, each including a scaled virtual desktop according to one embodiment of the invention.
Figure 8:
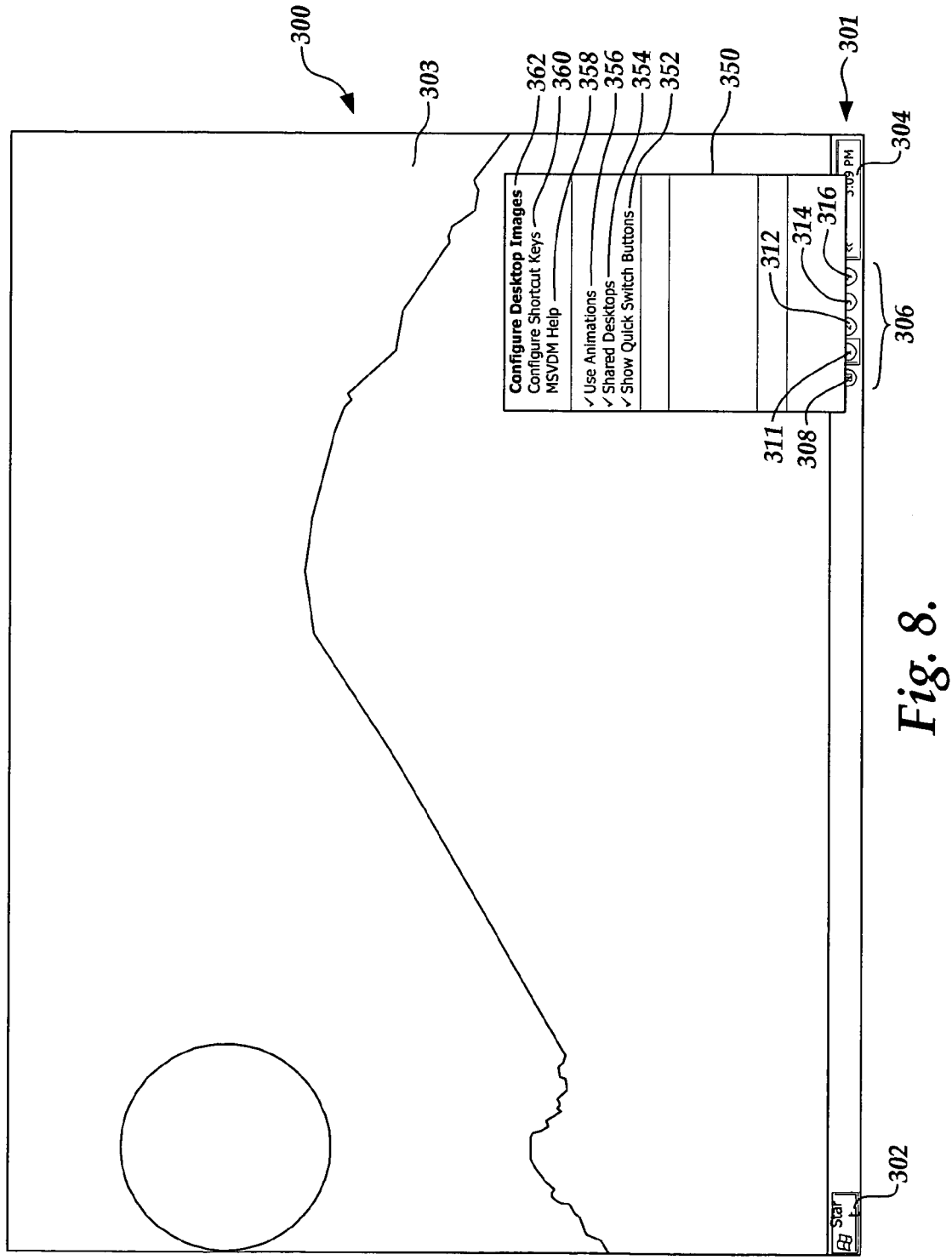
FIG. 8 is a pictorial diagram illustrating a pop-up menu used to configure virtual desktops according to one embodiment of the invention.
Figure 9:
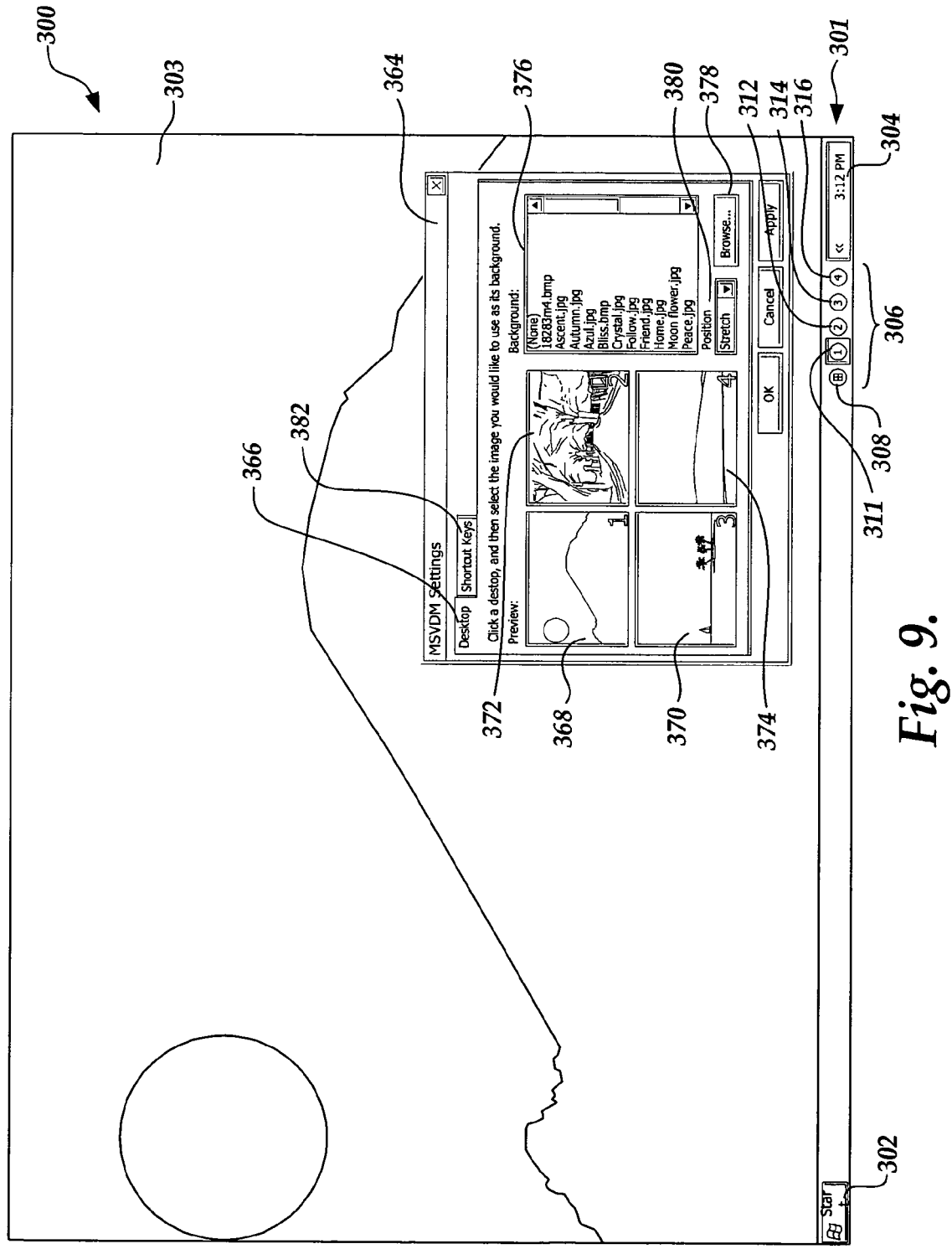
FIG. 9 is a pictorial diagram illustrating a dialog window for changing background images of virtual desktops according to one embodiment of the invention.

As shown in FIG. 8, the virtual desktop manager 306 can be actuated (e.g., by clicking on the right button of a mouse while a pointer is superjacent to the virtual desktop manager 306) to cause a pop-up menu 350 to appear on the on-screen work area 303 of the current full-size virtual desktop. Various features associated with managing scaled and full-size virtual desktops formed in accordance with the invention can be controlled by user interaction with the pop-up menu 350. A "Show Quick Switch Buttons" menu item 352, when selected, displays quick switch buttons 311-316, as illustrated by FIG. 3. The quick switch buttons 311-316 are not displayed if the menu item 352 is unselected, as shown in FIG. 4. A "Shared Desktops" menu item 354, if selected, allows application windows to be accessed in multiple desktops as discussed above with respect to FIG. 6. If unselected, applications are accessible only from the virtual desktop in which they were invoked, as shown in FIG. 7. A "Use Animations" menu item 356 results in the virtual desktop manager 306 animating the switching between the scaled virtual desktops shown in the preview window 310 and full-size virtual desktops as described above. A "MSVDM Help" menu item 358 allows a user to access a help window containing help information associated with virtual desktops. A "Configure Shortcut Keys" menu item 360 allows a user to configure a key or a key combination used to invoke a virtual desktop. A "Configure Desktop Images" menu item 362, when selected, brings up a dialog box 364 shown in FIG. 9 and described next.

The dialog box 364 automatically opens to a "Desktop" tab 366. The "Desktop" tab 366 reveals and presents a number of thumbnails 368-374. Each thumbnail shows the background image of a corresponding virtual desktop. The background image of a virtual desktop is change by a user selecting the thumbnail associated with the virtual desktop whose image is to be changed. Selection can be accomplished by the user clicking on the thumbnail. Then the user selects a desired background image from a list 376. If the displayed list 376 does not contain the desired background image, the user can use the browse button 378 to cause undisplayed background images to be displayed. A user can select a desired position for the background image by choosing from among the selections in a pull-down menu 380. In one embodiment of the invention, the selections include tile, center, and stretch.

Figure 10:
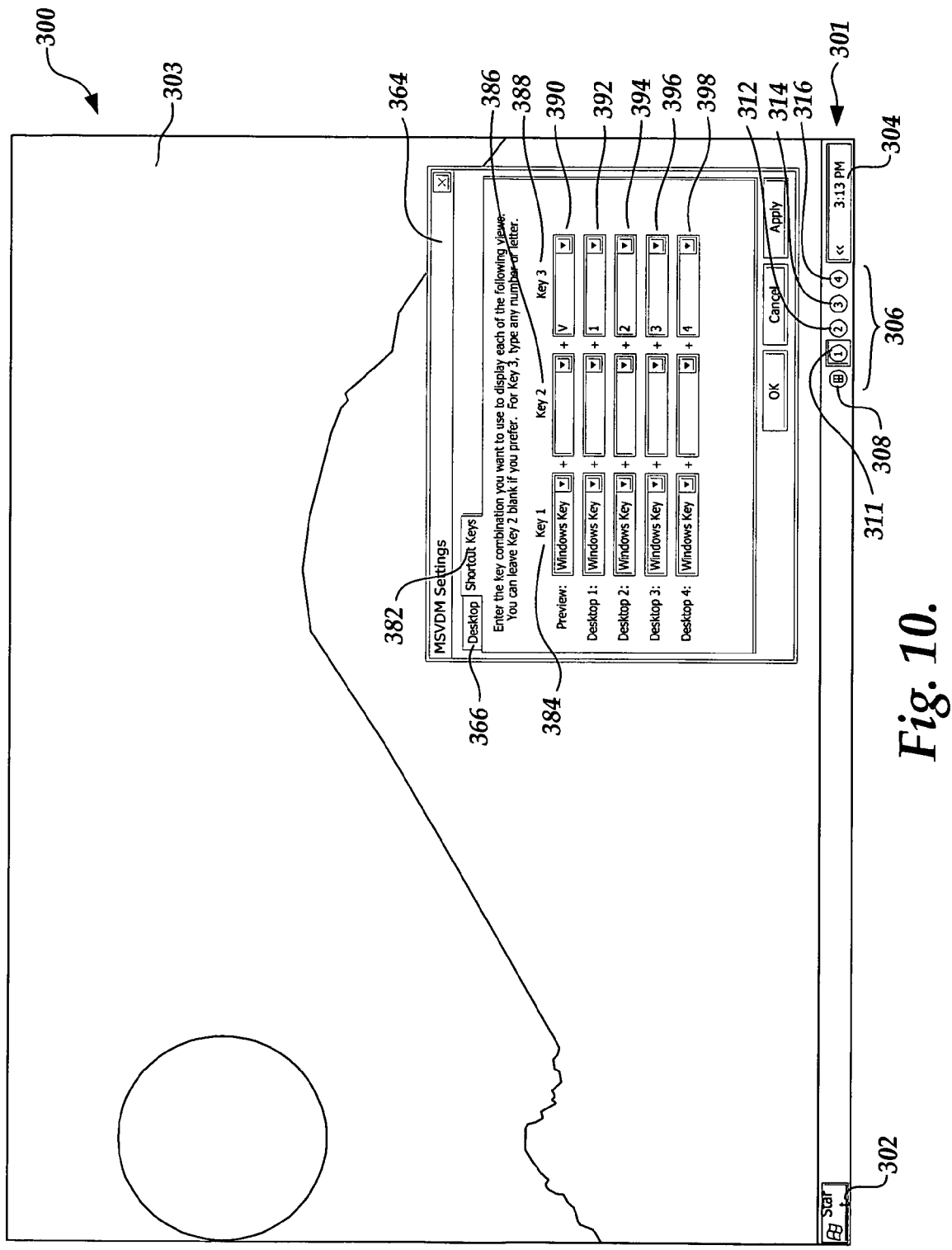
FIG. 10 is a pictorial diagram illustrating a dialog window for changing shortcut keys to access virtual desktops according to one embodiment of the invention.

The dialog box 364 also includes a "shortcut keys" tab 382. When selected, the tab 382 reveals the configuration matrix shown in FIG. 10. The configuration matrix also can be accessed by selecting the "Configure Shortcut Keys" menu item 360 shown in FIG. 8. The configuration matrix includes three columns. The first column 384 titled "Key 1" is the first key that must be pressed by the user to access either the preview window 310 or one of the full-size virtual desktops. The first key is configured by a user selecting one of the choices from the pull-down menus associated with the "Key 1" column. In one actual embodiment of the invention, the selections include the Windows key, the Alt key, the Control key, or the Shift key. The user may optionally configure a key in the second column 386, which is titled "Key 2". The second column keys are similar to the first column Keys, i.e., the Windows key, the Alt key, the Control key, or the Shift key. The user also configures the keys of the third column 388, which is titled "Key 3". Any number or letter may be used as the third key configuration. The first row 390 of the matrix defines a key combination that invokes the preview window 310, the second row 392 defines a key combination that invokes the full-size virtual desktop associated with the number 1, the third row 394 defines a key combination that invokes the full-size virtual desktop associated with the number 2, the fourth row 396 defines a key combination that invokes the full-size virtual desktop associated with the number 3, and the row 398 defines a key combination that invokes the full-size virtual desktop associated with the number 4.

Figure 11:
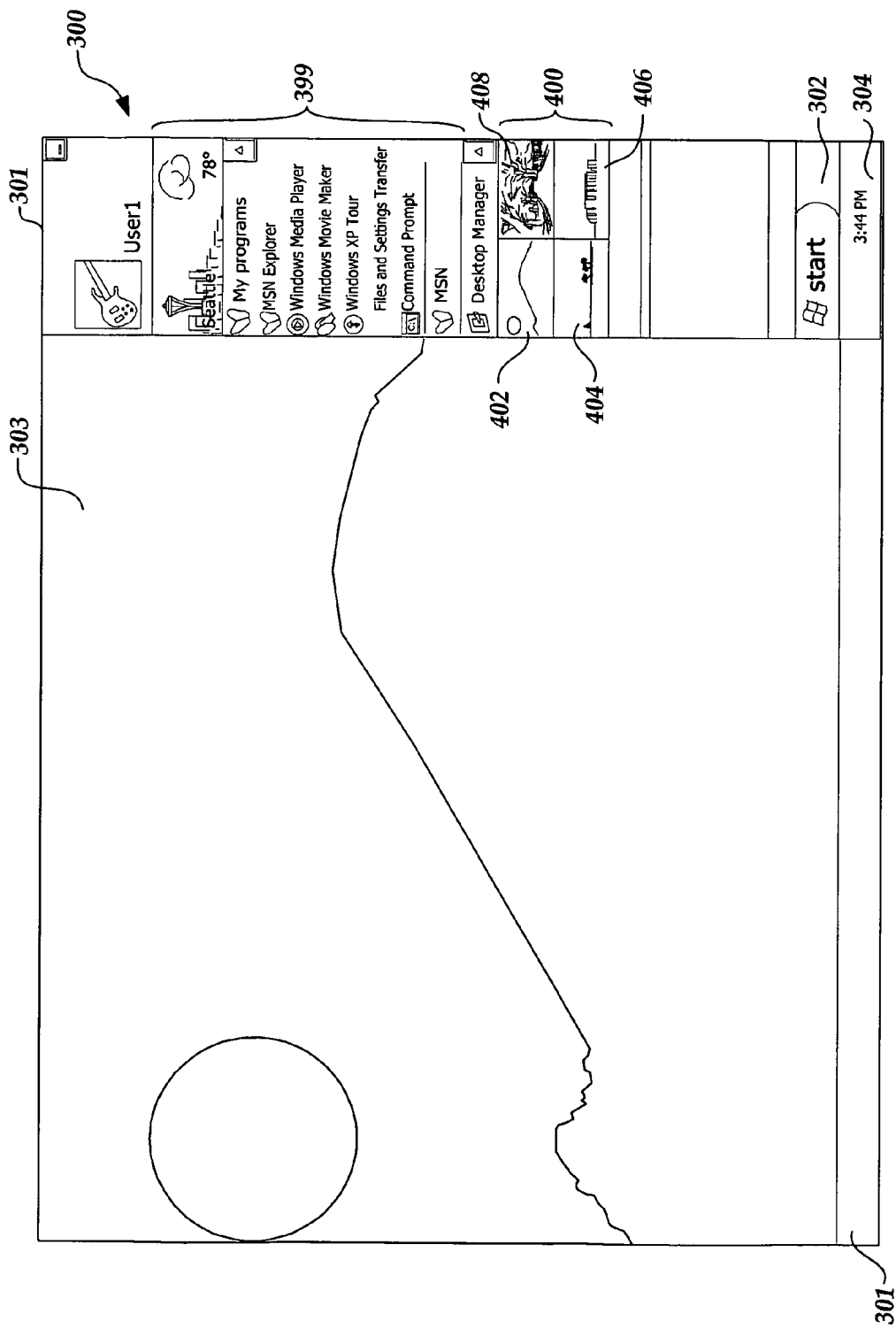
FIG. 11 is a pictorial diagram illustrating a virtual desktop with a desktop manager according to another embodiment of the invention.

FIG. 11 shows a virtual desktop manager 400 according to another embodiment of the present invention. Whereas in the previous embodiment, the set of quick switch buttons 311-316 are used to access multiple virtual desktops as discussed above, in this embodiment, thumbnails 402-406 associated with full-size virtual desktops are shown in task bar 301 located along one side of the on-screen work area 303 of the current full-size virtual desktop. The task bar may be a pop-up menu. A user accesses a desired virtual desktop by selecting the thumbnail 402-406 having the background image of the desired virtual desktop. If application windows are active in any of the associated full-size virtual desktops, the thumbnails 402-406 show the active application windows as shadows similar to those discussed above with reference to FIGS. 6 and 7. A number of applications 399 not yet launched as application windows are shown on the taskbar 301. When a full-size virtual desktop is shown on the on-screen work area 303, the thumbnail corresponding to the shown full-size virtual desktop is highlighted along its periphery in the desktop virtual manager 400.

Preferably, the desktop virtual manager 400 has an animation capability that animates the presentation of virtual desktops in a way that gives a user a spatial sense of the arrangement of the virtual desktops. If animation is enabled, when the user switches from one virtual desktop to another, the graphical user interface sets the old virtual desktop as a starting point in the animation and progressively shrinks the old virtual desktop. Contemporaneously, the graphical user interface progressively reveals the new virtual desktop, which is the ending point of the animation, as the old virtual desktop is shrinking.

Figure 13A:
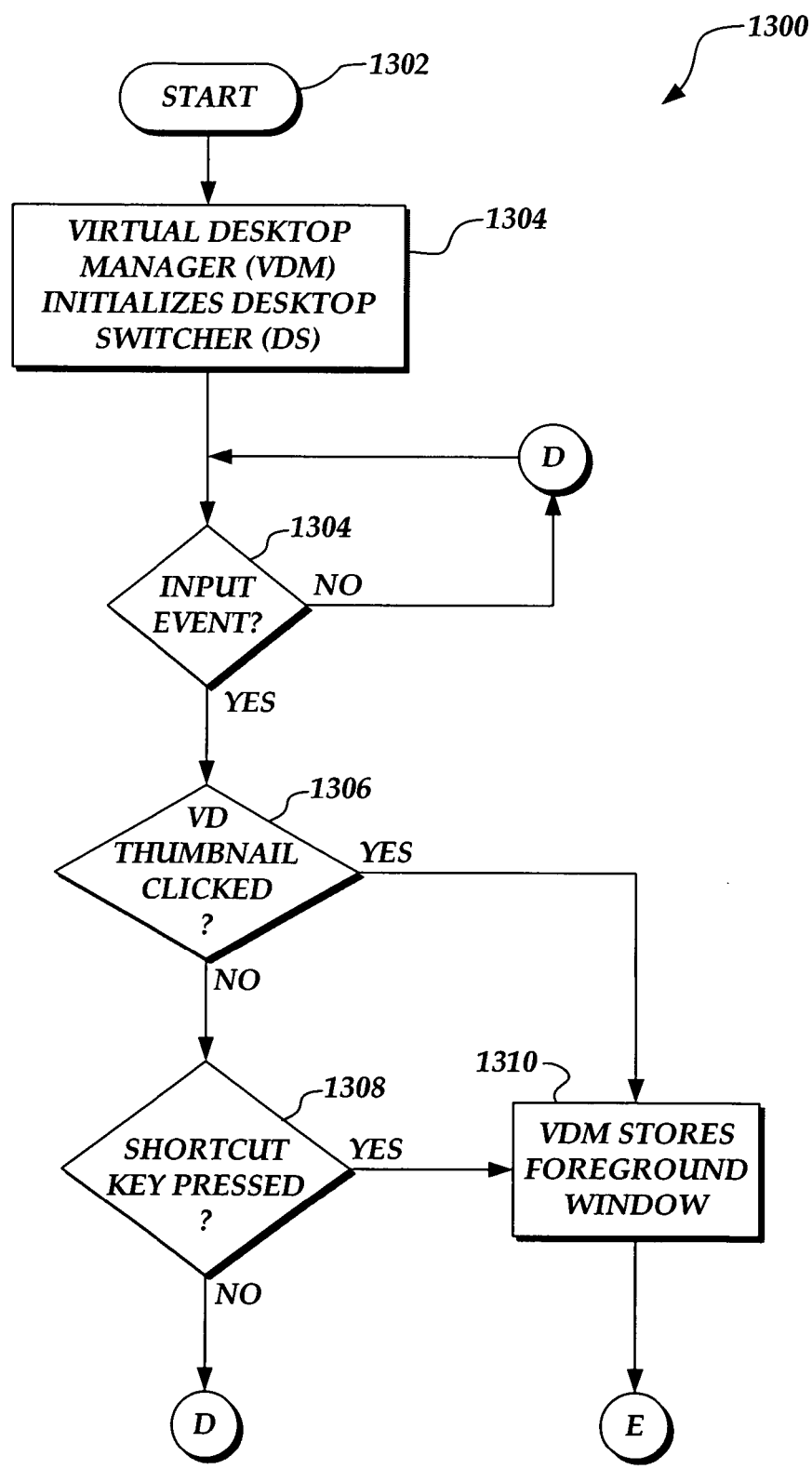
FIGS. 13A-13B are process diagrams illustrating the software flow of a virtual desktop manager according to another embodiment of the invention.
Figure 13B:
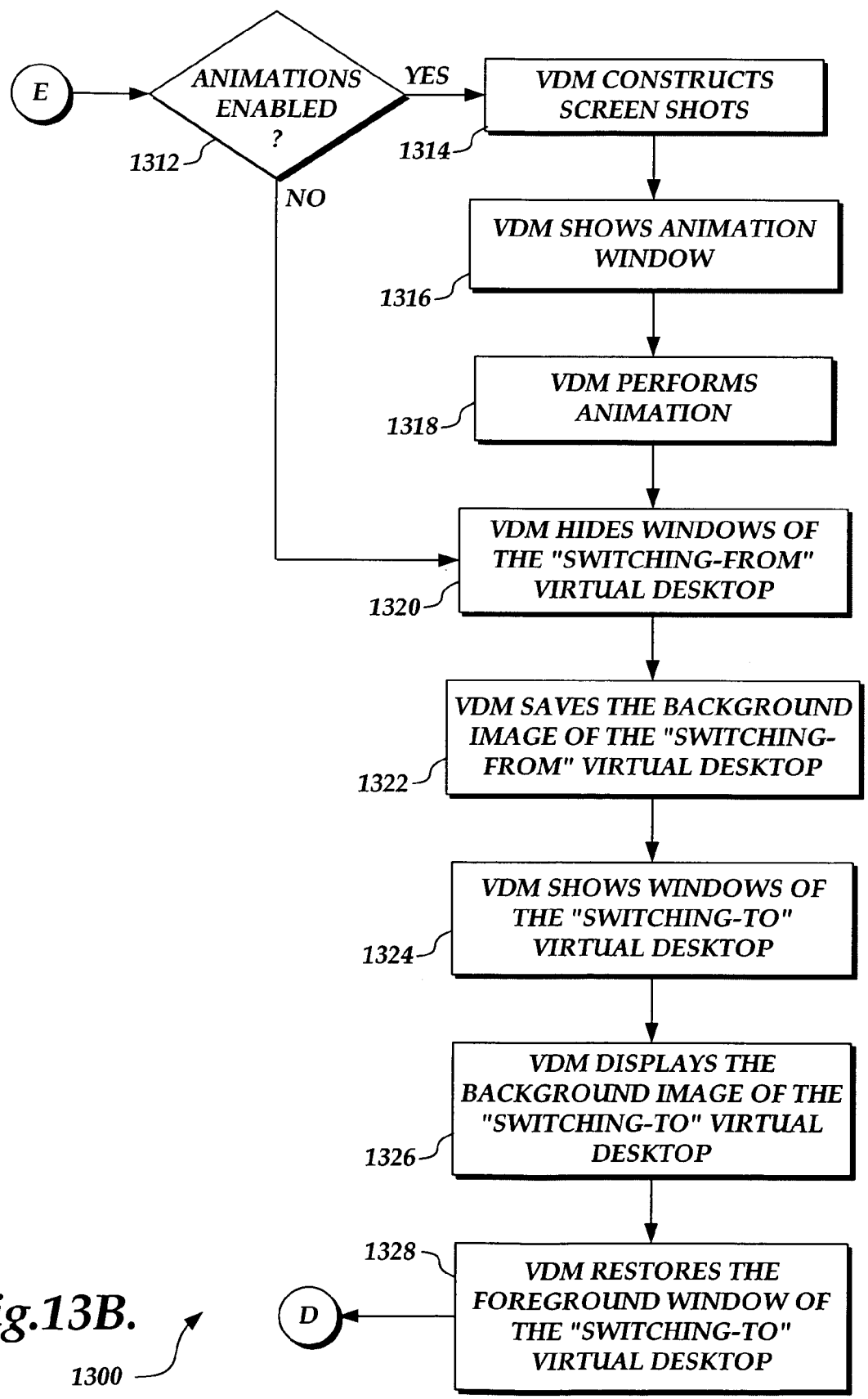

For example, suppose a sequence of actions begins with the user being presented a first full-size virtual desktop associated with thumbnail 402. Suppose next that the user clicks on the thumbnail 406. In response, the desktop virtual manager 400 progressively shrinks (zooms) the dimensions of the first virtual desktop. At the same time as the virtual desktop manager 306 animates (shrinks) the first virtual desktop in this manner, it gradually displays a second virtual desktops associated with the thumbnail 406. One suitable technique, although other techniques are also possible, for implementing this animation capability of the desktop virtual manager 400 is illustrated in FIGS. 13A-13B, which will be described later.

Figure 12A:
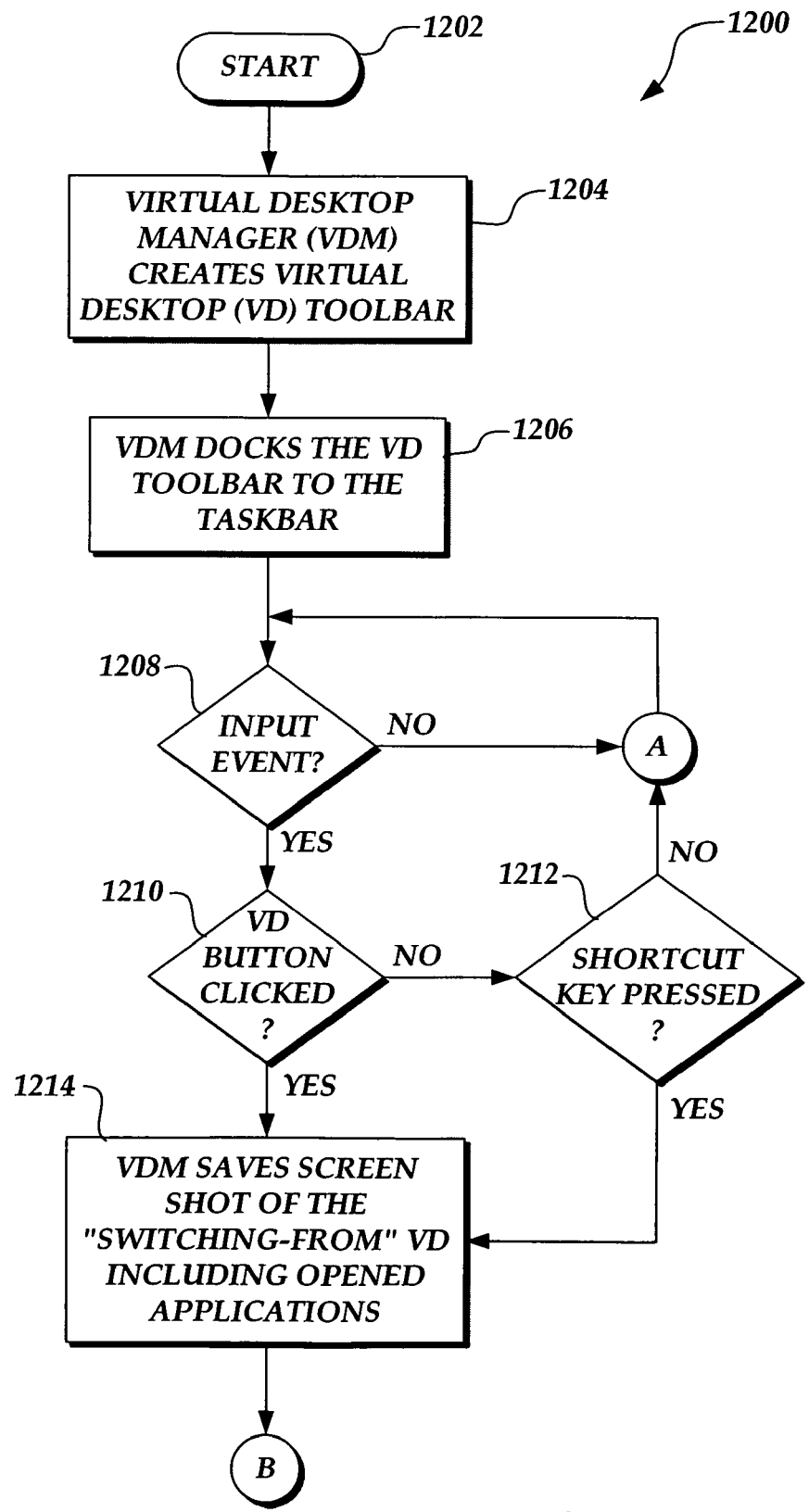
FIGS. 12A-12C are process diagrams illustrating the software flow of a virtual desktop manager according to one embodiment of the invention.
Figure 12B:
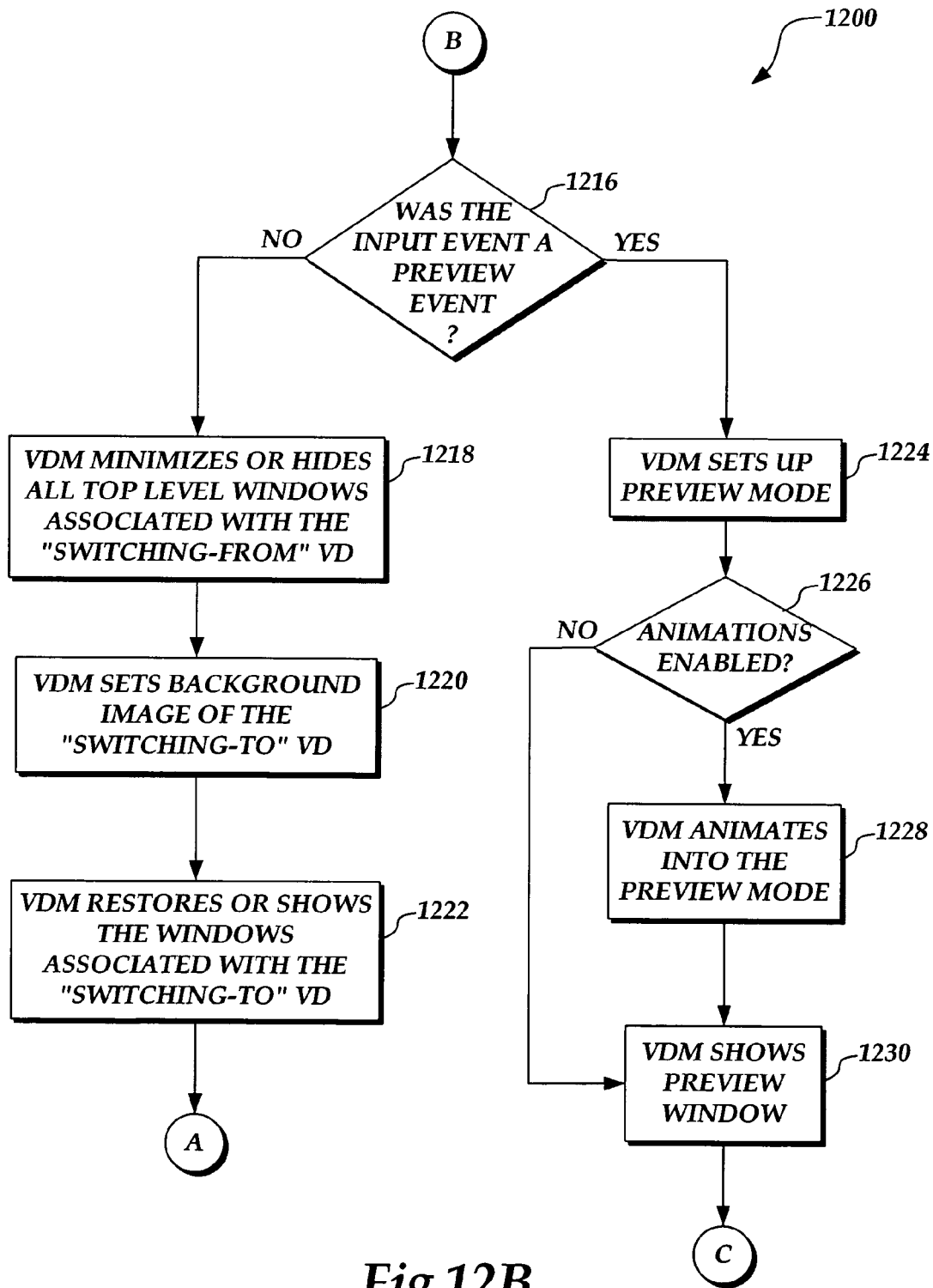
Figure 12C:
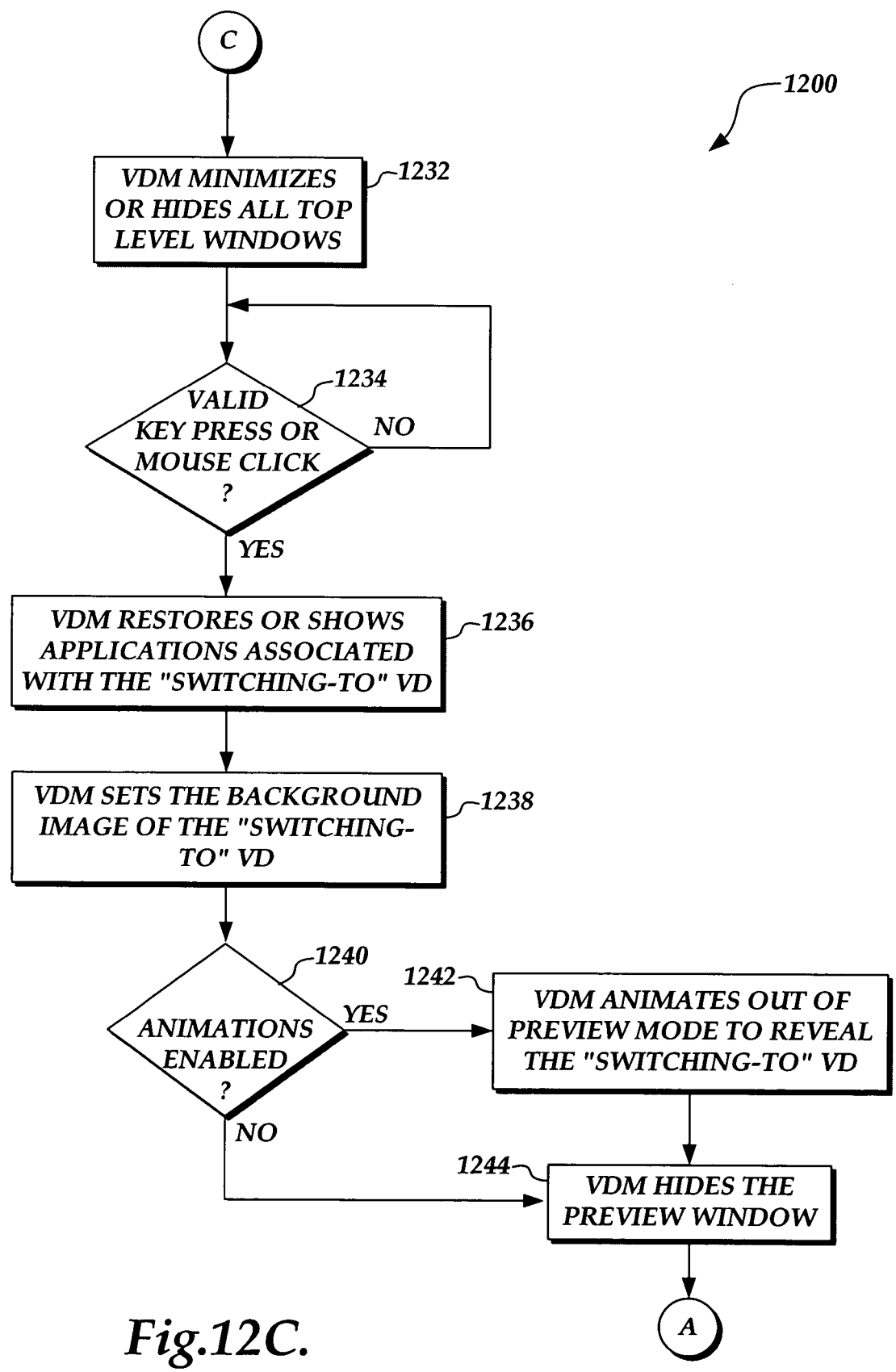

The operation of the virtual desktop manager 306, as described above with reference to FIGS. 3-10, is further illustrated in the process 1200 shown in FIGS. 12A-12C. The process 1200 begins at a start block 1202 and proceeds directly to a block 1204, where the virtual desktop (VDM) manager 306 creates a virtual desktop (VD) toolbar and docks or attaches the virtual desktop toolbar to the taskbar 301, as shown by at a block 1206.

Next, the process 1200 proceeds to a decision block 1208 to check whether the user has produced an input event using a mouse, a keyboard, or other input device. If the answer to the decision block 1208 is NO, the process 1200 enters a node A that loops back to decision block 1208. The process remains in this way until the user actually produces an input event.

If the answer to the decision block 1208 is YES, the process proceeds to another decision block 1210. In this regard, as shown in FIG. 3, the preview button 308 and the quick button 311-316 are displayed for the user to activate. Decision block 1210 tests the activation of these buttons. If any of the buttons 308-316 is activated by the user, the answer to decision block 1210 is YES, and the process 1200 proceeds to a block 1214 (explained later). If the answer to decision block 1210 is NO, the process proceeds to decision block 1212. At decision block 1212, the process 1200 determines the input event detected at decision block 1208 is the actuation of a shortcut key. If an invalid shortcut key was pressed, the answer to the decision block 1212 is NO, and the process 1200 proceeds to the node A and loops back to decision block 1208. If a valid shortcut key was pressed, the process proceeds to at block 1214 where the virtual desktop manager 306 saves the screenshot of the "switching-from" virtual desktop including any open application windows. Afterwards, the process 1200 proceeds to node B, which is further described at FIG. 12B.

From the node B, the process 1200 proceeds to a decision block 1216 where a test is made to determine if the input event was generated by the user clicking the preview button 308 or if the shortcut key invoking the preview window 301 was pressed. If the input event was not a preview event, the answer to the decision block 1216 is NO, and the process proceeds to a block 1218. At block 1218, the virtual desktop manager 306 minimizes or hides all top level windows associated with the "switching-from" virtual desktop. Next, at block 1220, the virtual desktop manager 306 sets the background image of the "switching-to" virtual desktop. Next, at a block 1222, the virtual desktop manager 306 restores or shows all top level windows associated with the "switching-to" virtual desktop. Having switched to the desired virtual desktop, the process 1200 proceeds from the block 1222 to node A and then loops back to decision block 1208 to await further input events.

If the input event was a preview event, the answer to decision block 1216 is YES, and the process 1200 proceeds to a block 1224. At block 1224, the virtual desktop manager 306 sets up the preview mode. Some of the tasks involved in setting up the preview mode include bringing up a preview window 301, providing the borders on the preview window 301 to separate each scaled virtual desktop from the others, and drawing a transparent number at the lower right corner of each scaled virtual desktop.

When the setting up of the preview mode is finished, the process proceeds to where a test is made to determine if animation is enabled at a decision block 1226. If animation is enabled, the process proceeds to a block 1228. At block 1228, the virtual desktop manager 306 animates the current full-size virtual desktop into the scaled virtual desktop on the preview window 301 by defining the screenshot of the current full-size virtual desktop as the starting point of the animation and defining the corresponding scaled virtual desktop of the preview window 310 as the ending point of the animation. When the animation is completed, the process proceeds to a block 1230 where the virtual desktop manager 306 shows the preview window 310. If animation is not enabled, the answer to the decision block 1226 is NO, and the process 1200 proceeds directly to block 1230. Next, the process 1200 proceeds to node C, which is further described at FIG. 12C.

From node C the process 1200 continues to a block 1232 where the virtual desktop manager 306 minimizes and hides all top level windows. This is done to prevent inadvertent flickering between the preview window 301 and other windows while the preview window 301 is displayed.

While the preview window 301 is displayed to the user, the process 1200 awaits in a feedback loop at a decision block 1234 for the user to select one of the scaled virtual desktops 320-326 as shown in FIG. 5. When a valid selection is made, the answer to decision block 1234 is YES, and the process proceeds to a block 1236. At block 1236 the virtual desktop manager 306 restores and shows the application windows associated with the "switching-to" full-size virtual desktop. Then, at block 1238, the virtual desktop manager 306 sets the background image of the "switching-to" virtual desktop. If animation is enabled, at a decision block 1240, the process 1200 proceeds to a block 1242 where the virtual desktop manager 306 animates out of the scaled virtual desktop shown in the preview window to the "switching-to" virtual desktop. In this particular animation sequence, the starting point is the scaled virtual desktop that corresponds to the "switching-to" virtual desktop and the ending point of the animation is the "switching-to" full-size virtual desktop. Next, the process 1200 flows to a block 1244 where the virtual desktop manager 306 hides the preview window 301. If at decision block 1240, animation was not enabled, the process proceeds directly to block 1244. From block 1244 the process proceeds to node A and loops back to decision block 1304 to wait further input events.

The operation of the virtual desktop manager 400 as illustrated in FIG. 11 is further explained by the process 1300 shown in FIGS. 13A-13B. The process 1300 proceeds from a start block 1302 to a block 1304 where the virtual desktop manager 400 initializes a desktop switcher (DS). The desktop switcher comprises multiple thumbnails 402-408. The thumbnails 402-408 create an input event when activated by a user. An alternative way to produce an input event is the activation of a short cut key.

The process 1300 flows to a decision block 1304 where it checks to see if an input event has occurred. If there no input event has occurred, the process 1300 proceeds to a node D and loops back to decision block 1304 to wait for a valid input event. If the answer to decision block 1304 is YES, the process proceeds to another decision block 1306 where a test is made to determine if one of the thumbnails 402-408 was activated by user. If the answer to decision block 1306 is YES, the process proceeds to a block 1310 is entered. Otherwise, the process proceeds to a decision block 1308 where a test is made to determine if the user has input a key or a combination of keys to invoke one of the virtual desktops, i.e., has actuated a shortcut. If the answer to decision block 1308 is NO, the process proceeds to node D and awaits a further input event (decision block 1304). If the answer to decision block 1308 is YES, the virtual desktop manager 400 proceeds to block 1310 where the foreground window of the current full-size virtual desktop, which is also defined as the "switching-from" virtual desktop, is stored. From block 1310, the process 1300 proceeds to node E and FIG. 13B.

From node E, the process 1300 proceeds to a decision block 1312 where a test is made to determine if animation is enabled. If animation is enabled the process proceeds to a block 1314. At block 1314, the virtual desktop manager 400 constructs screen shots for both the "switching-from" virtual desktop and the "switching-to" virtual desktop. These screen shots will be used in the construction of the animation window at a block 1316. When the virtual desktop manager 400 has displayed the animation window, the animation will be performed at a block 1318 where the starting point of the animation is the constructed screen shot of the "switching-from" virtual desktop and the ending point of the animation is the "switching-to" virtual desktop. When the animation is completed by showing the transition from the "switching-from" virtual desktop to the "switching-to" virtual desktop, the virtual desktop manager 400 hides active application windows of the "switching-from" virtual desktop at a block 1320 and saves the background image of the "switching-from" virtual desktop at a block 1322.

The process 1300 then proceeds to a block 1324 from the block 1322, where the virtual desktop manager 400 shows the opened application windows of the "switching-to" virtual desktop. Then, the virtual desktop manager 400 displays the background image of the "switching-to" virtual desktop at a block 1326. At a block 1328, the foreground application window of the "switching-to" virtual desktop is restored by the virtual desktop manager 400. From here, the process 1300 re-enters the node D where it loops to the decision block 1304 to await further input events.

While the preferred embodiment of the invention has been illustrated and described, it will be appreciated that various changes can be made therein without departing from the spirit and scope of the invention.

The invention claimed is:

1. A method for providing a desktop switcher to switch among multiple virtual desktops in a graphical user interface being presented on a display of a computer system, each virtual desktop having a background image similar to or different from the background image of another virtual desktop, the method comprising:

displaying a set of thumbnails, each thumbnail representing a full-size virtual desktop of the multiple virtual desktops, and each thumbnail having a background image that corresponds to the background image of the full-size virtual desktop represented by the thumbnail;

displaying one or more shadows in each thumbnail if the full-size virtual desktop represented by the thumbnail has one or more application windows that are opened on the full-size virtual desktop, each shadow being a faint representation of an application window that is opened on the full-size virtual desktop; and without switching from one full-size virtual desktop to another full-size virtual desktop when the user clicks on a thumbnail from the set of thumbnails to access an application window running in the another full-size virtual desktop, clicking on a task button, which is not a shadow, coupled to the application window to switch the application window from the another full-size virtual desktop in which the application window was located to the one full-size virtual desktop.

2. The method of claim 1, further comprising: displaying the act of switching from one full-size virtual desktop to another full-size virtual desktop as an animation by setting the one virtual desktop as a starting point of the animation and the another virtual desktop as an ending point of the animation.

3. The method of claim 1, further comprising:

receiving a dragged event when the user drags a shadow in one thumbnail to another thumbnail and receiving a dropped event when the user drops the shadow on the another thumbnail, the shadow that is dropped being defined as a dropped shadow; and displaying the dropped shadow on the another thumbnail, and displaying the application window that corresponds to the dropped shadow on the virtual desktop that corresponds to the another thumbnail when the act of switching switches to the virtual desktop that corresponds to the another thumbnail.

4. The method of claim 1, further comprising:

receiving an indication from a user for changing an old background image of the virtual desktop to a new background image; and displaying the new background image of the virtual desktop as well as the new background image for the thumbnail that corresponds to the virtual desktop.

5. The method of claim 1, further comprising: outlining the thumbnail for which the corresponding full-size virtual desktop is currently presented on the display.

6. A computer-readable medium having computer-executable instructions stored thereon for performing a method for providing a desktop switcher to switch among multiple virtual desktops in a graphical user interface being presented on a display of a computer system, each virtual desktop having a background image similar to or different from the background image of another virtual desktop, the method comprising:

displaying a set of thumbnails, each thumbnail representing a full-size virtual desktop of the multiple virtual desktops, and each thumbnail having a background image that corresponds to the background image of the full-size virtual desktop represented by the thumbnail;

displaying one or more shadows in each thumbnail if the full-size virtual desktop represented by the thumbnail has one or more application windows that are opened on the full-size virtual desktop, each shadow being a faint representation of an application window that is opened on the full-size virtual desktop; and without switching from one full-size virtual desktop to another full-size virtual desktop when the user clicks on a thumbnail from the set of thumbnails to access an application window running in the another full-size virtual desktop, clicking on a task button, which is not a shadow, coupled to the application window to switch the application window from the another full-size virtual desktop in which the application window was located to the one full-size virtual desktop.

* * * * *